United States Patent
Epp et al.

(10) Patent No.: US 12,308,501 B2
(45) Date of Patent: May 20, 2025

(54) VENTING OF SEALED FUEL CELL ENCLOSURE

(71) Applicant: HYDROGENICS CORPORATION, Mississauga (CA)

(72) Inventors: Bryn Epp, Barrie (CA); Andrew Hill, Scarborough (CA); Nader Zaag, Milton (CA); David Pubrat, Burlington (CA); Sonia Sorbera, Woodbridge (CA); Myen Krishnathas, Mississauga (CA); Robert Bencak, Georgetown (CA)

(73) Assignee: HYDROGENICS CORPORATION, Mississauga (CA)

( * ) Notice: Subject to any disclaimer, the term of this patent is extended or adjusted under 35 U.S.C. 154(b) by 557 days.

(21) Appl. No.: 17/833,418

(22) Filed: Jun. 6, 2022

(65) Prior Publication Data

US 2022/0393220 A1 Dec. 8, 2022

Related U.S. Application Data

(60) Provisional application No. 63/208,334, filed on Jun. 8, 2021.

(51) Int. Cl.
*H01M 8/2485* (2016.01)
*H01M 8/04089* (2016.01)

(52) U.S. Cl.
CPC ..... *H01M 8/2485* (2013.01); *H01M 8/04104* (2013.01)

(58) Field of Classification Search
None
See application file for complete search history.

(56) References Cited

U.S. PATENT DOCUMENTS

| | | | | |
|---|---|---|---|---|
| 3,473,963 A * | 10/1969 | Sanderson | .......... | H01M 8/0662 429/410 |
| 5,156,925 A * | 10/1992 | Lapp | .............. | H01M 50/77 429/408 |
| 5,356,729 A * | 10/1994 | Pedicini | .............. | H01M 12/08 429/407 |
| 5,560,999 A * | 10/1996 | Pedicini | .............. | H01M 10/633 429/444 |
| 5,721,064 A * | 2/1998 | Pedicini | .......... | H01M 8/04097 429/415 |
| 2002/0102452 A1* | 8/2002 | Reiser | .............. | H01M 8/0258 429/455 |
| 2004/0048123 A1 | 3/2004 | Kelly et al. | | |
| 2007/0099040 A1* | 5/2007 | Morita | .............. | H01M 8/04231 429/513 |

(Continued)

FOREIGN PATENT DOCUMENTS

| | | |
|---|---|---|
| CN | 104282926 | 4/2017 |
| CN | 111244523 | 5/2020 |

(Continued)

OTHER PUBLICATIONS

JP-2003132916-A—machine translation (Year: 2003).*

*Primary Examiner* — Haroon S. Sheikh
(74) *Attorney, Agent, or Firm* — Barnes & Thornburg LLP

(57) ABSTRACT

A venting system includes a housing and an air intake manifold. The housing receives a fuel cell stack, and the air intake manifold extends along the fuel cell stack. The air intake manifold directs a flow of air to the fuel cell stack, and is disposed adjacent to and in contact with the fuel cell stack.

20 Claims, 6 Drawing Sheets

(56) References Cited

U.S. PATENT DOCUMENTS

| | | | |
|---|---|---|---|
| 2007/0281201 A1* | 12/2007 | Sederquist | ........ H01M 8/04231 |
| | | | 429/444 |
| 2013/0089800 A1 | 4/2013 | Merth et al. | |
| 2018/0248207 A1 | 8/2018 | Kim et al. | |
| 2019/0140293 A1 | 5/2019 | Blanchet | |
| 2022/0352530 A1 | 11/2022 | Rewers et al. | |

FOREIGN PATENT DOCUMENTS

| | | | | |
|---|---|---|---|---|
| EP | 1095414 | | 1/2003 | |
| JP | 2003132916 A | * | 5/2003 | ........ H01M 8/04089 |
| JP | 2017532739 | | 11/2017 | |
| WO | 2005099017 | | 11/2006 | |
| WO | 2020260035 | | 12/2020 | |

\* cited by examiner

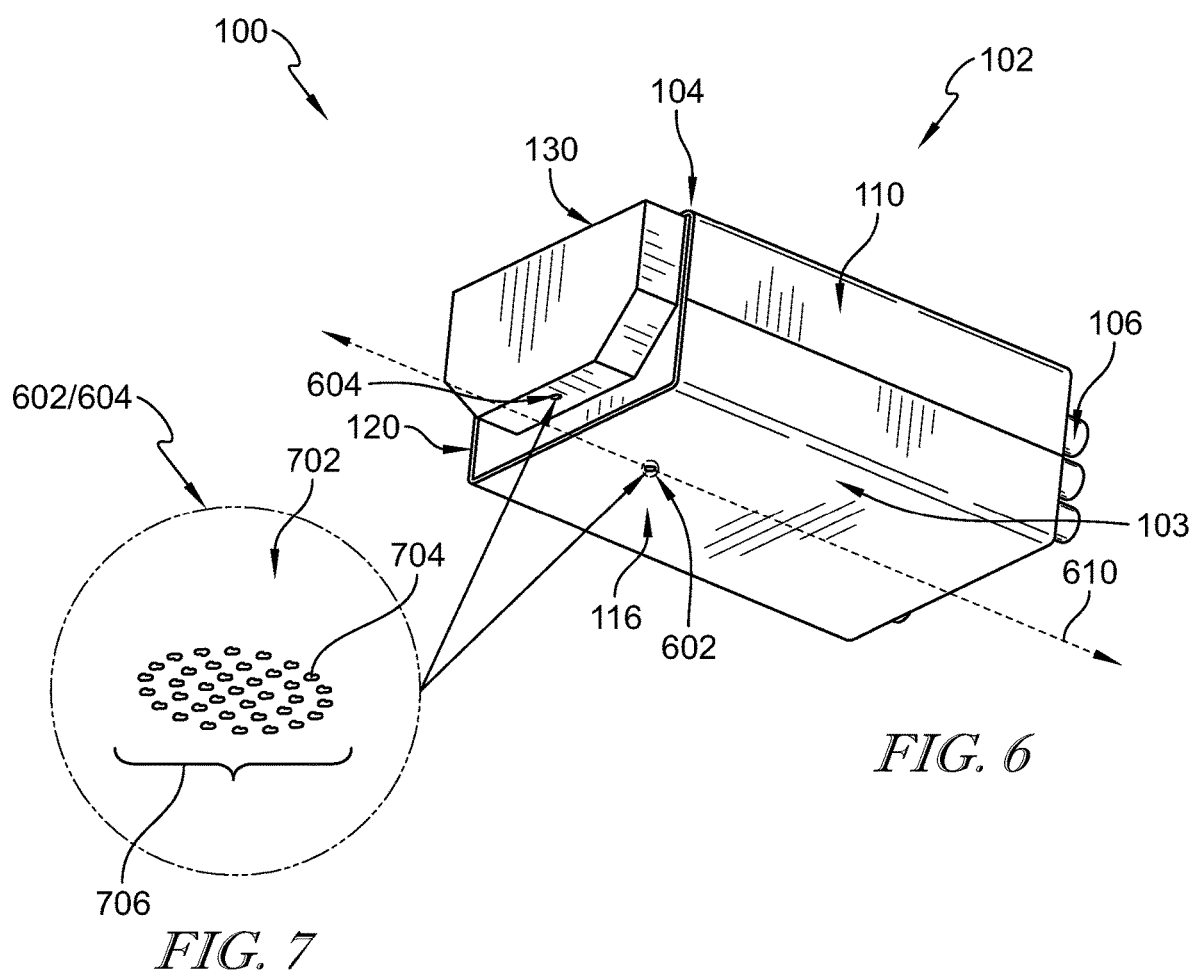

VENTING OF SEALED FUEL CELL ENCLOSURE

CROSS-REFERENCE TO RELATED APPLICATIONS

This nonprovisional application claims the benefit and priority, under 35 U.S.C. § 119(e) and any other applicable laws or statutes, to U.S. Provisional Patent Application Ser. No. 63/208,334 filed on Jun. 8, 2021, the entire disclosure of which is hereby expressly incorporated herein by reference.

TECHNICAL FIELD

The present disclosure generally relates to systems for venting a sealed enclosure of a fuel cell stack.

BACKGROUND

A fuel cell stack operates using a supply of oxygen and hydrogen. The housing configured to receive the fuel cell stack may be tightly sealed to keep an interior of the housing free of debris or foreign objects that may interfere with performance of either the entire fuel cell stack or individual fuel cells of the fuel cell stack.

During normal operation of the fuel cell stack, hydrogen molecules may escape from sealed plates of the fuel cells and may build up within the housing that retains the fuel cell stack. Depending on pressure and/or temperature fluctuations within the housing during normal operation of a fuel cell power module, moisture and/or vapor may become present for brief or extended periods. Presence of such moisture and/or vapor may be undesirable for optimal operation of the fuel cell stack, individual components of the fuel cell stack, or other subsystems coupled directly or indirectly to the fuel cell power module. The present disclosure is directed to a system for venting a sealed enclosure of a fuel cell stack.

SUMMARY

A venting system includes a housing configured to receive a fuel cell stack, and an air intake manifold extending along the fuel cell stack and configured to direct a flow of air thereto. The air intake manifold is disposed adjacent to and in contact with the fuel cell stack, the air intake manifold defines an opening to redirect a portion of the flow of air to pass above the fuel cell stack to mix with one or more hydrogen molecules present above the fuel cell stack, and the housing defines a vent aperture and the portion of the air including the one or more hydrogen molecules is vented through the vent aperture.

A venting system including a housing configured to receive a fuel cell stack, and an air intake manifold is disposed to direct a flow of air toward the fuel cell stack. The air intake manifold is configured to direct a portion of the flow of air to bypass the fuel cell stack to mix with one or more hydrogen molecules released by the fuel cell stack, the housing defines a first vent aperture and a second vent aperture, and the portion of the air, including the one or more hydrogen molecules, is vented through the first vent aperture and the second vent aperture.

A venting system including an enclosure having an open top and configured to receive a fuel cell stack, a cover configured to fit over the open top and brace sidewalls of the enclosure to seal the enclosure, and an air intake manifold extending adjacent to and in contact with the fuel cell stack to direct a flow of air to the fuel cell stack. The air intake manifold defines an opening to redirect a portion of the flow of air to bypass the fuel cell stack, and the housing defines a vent aperture and the portion of the air is vented through the vent aperture.

BRIEF DESCRIPTION OF THE DRAWINGS

The detailed description particularly refers to the following figures, in which:

FIG. 6 is a block diagram illustrating an example location of a vent aperture of the fuel cell power module in accordance with the present disclosure;

FIG. 7 is a block diagram illustrating an example geometric shape of a cluster of holes of the vent aperture;

DETAILED DESCRIPTION

Figure 1:
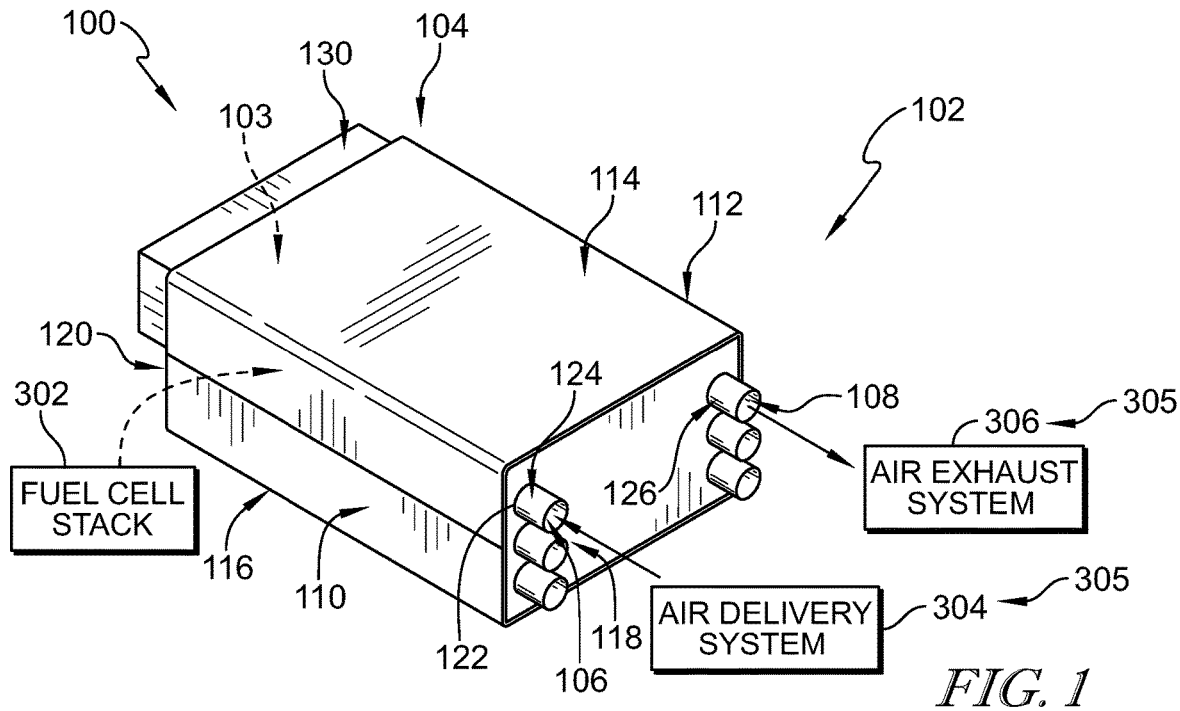
FIG. 1 is a block diagram illustrating a perspective view of a fuel cell power module.

The present disclosure is directed to a venting system 100 for venting an enclosure 104 of a fuel cell power module 102 and/or a fuel cell stack 302. An enclosure 104 may be any housing 104 configured to receive and/or protect a fuel cell stack 302. The housing 104 may be sealed or unsealed. In a preferred embodiment, the housing 104 is sealed.

A housing 104 of an air intake manifold 106 may define a bleed port 402 or another opening 402 sized to permit air flow within the housing 104. A bleed port 402 may be implemented in the air intake manifold 106 to allow a portion 502, 506 of air flow 504 within the housing 104 to be redirected to bypass the fuel cell stack 302. Additionally or alternatively, the housing 104 may define one or more vent apertures 602, 604 to vent (or release) the redirected portion 502, 506 of air flow from within an interior 103 of the housing 104.

In some embodiments, redirecting and/or venting a portion 502, 506 of the intake air flow may lower an amount of hydrogen and/or lower pressure within the housing 104. The housing 104 and the air intake manifold 106 may be configured to redirect and/or vent the portion 502, 506 of intake air flow 504. This redirected intake air 502, 506 flow may provide positive pressure to dry air and minimize the likelihood that water, water vapor, or condensation forms and/or persists within an interior 103 of the housing 104.

Figure 2:
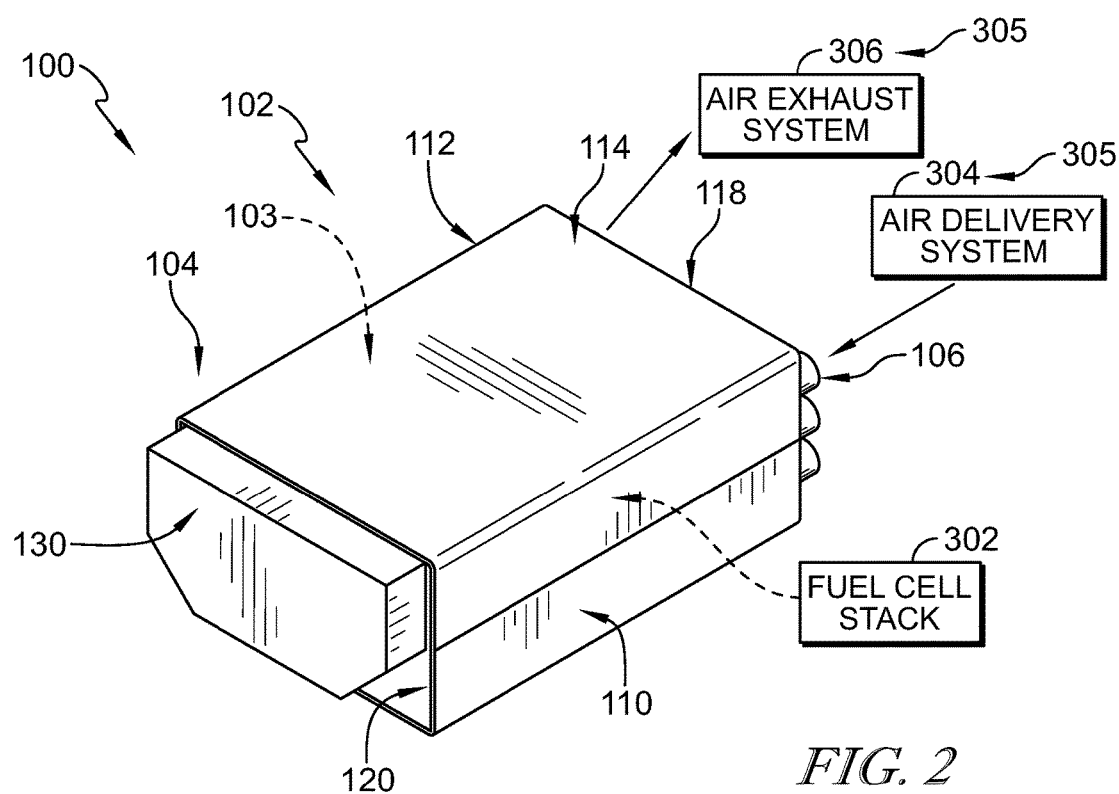
FIG. 2 is a block diagram illustrating another perspective view of the fuel cell power module of FIG. 1.
Figure 3:
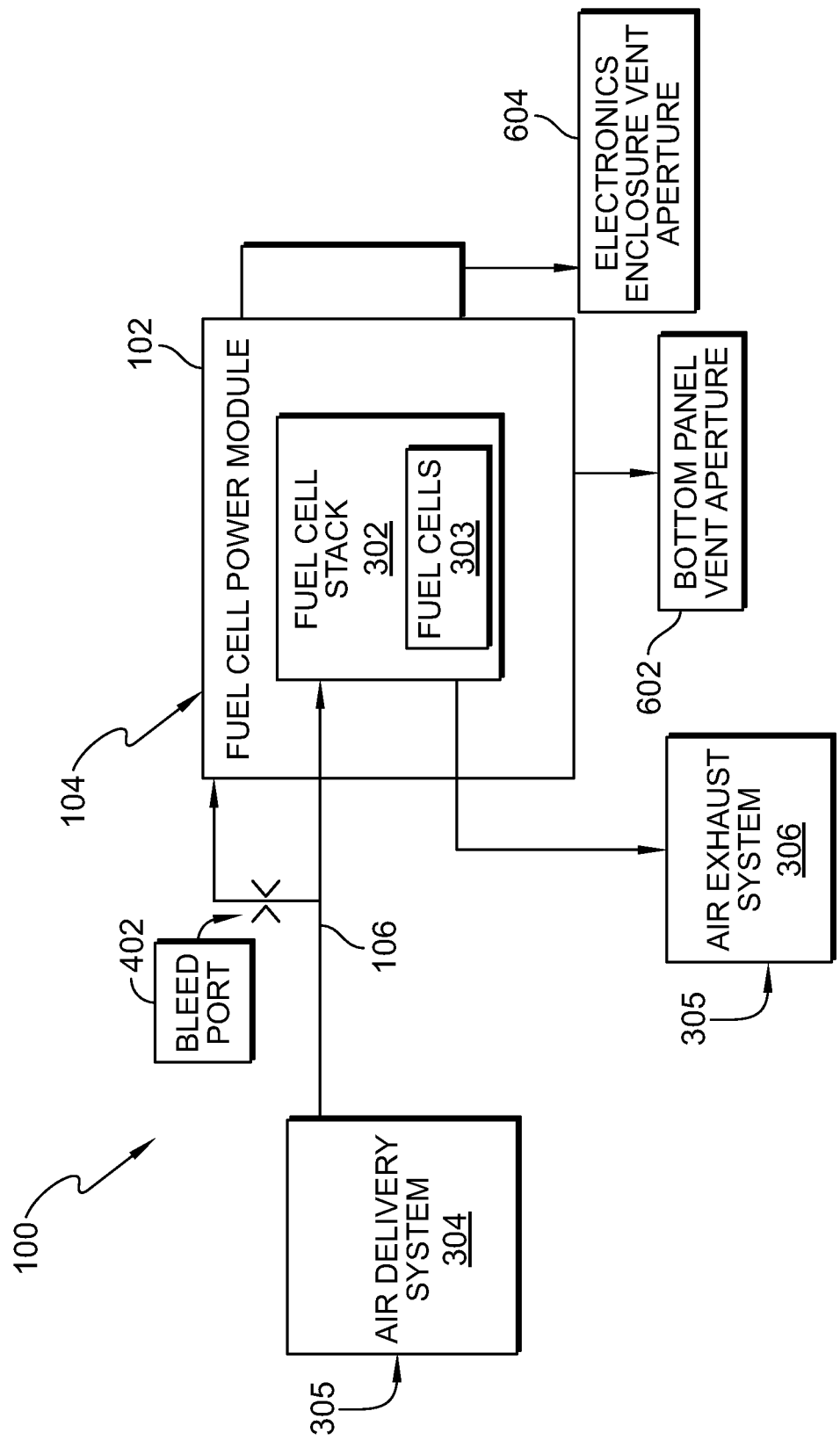
FIG. 3 is a block diagram illustrating an air delivery system and an air exhaust system of the fuel cell power module of the present disclosure.

FIGS. 1 and 2 illustrate perspective views of a fuel cell power module 102 for venting a sealed fuel cell enclosure 104 in accordance with the present disclosure. In an example illustrated in at least FIG. 3, the fuel cell power module 102 is configured to receive at least one fuel cell stack 302. The fuel cell stack 302 may comprise one or more fuel cells 303 and/or fuel cell systems 303. As such, the fuel cell power module 102 may comprise one or more fuel cell systems 303 and/or one or more fuel cell stacks 302. In one example, the one or more fuel cell stacks 302 of the fuel cell power module 102 is configured to receive one or more fuel cells 303. Other implementations of the fuel cell power module 102, such as the fuel cell power module 102 having more or fewer components, are also contemplated.

The one or more fuel cells 303 of the fuel cell power module 102 may include, but are not limited to, a phosphoric acid fuel cell (PAFC), a molten carbonate fuel cell (MCFC), a proton exchange membrane fuel cell, also called a polymer exchange membrane fuel cell (PEMFC), and a solid oxide fuel cell (SOFC). In one embodiment, the one or more fuel cells 303 of the fuel cell power module 102 comprises, consists essentially of, or consists of a PEMFC, such as a PEMFC fueled by hydrogen.

The fuel cell power module 102 is configured to communicatively (fluidically, mechanically, or some combination thereof) couple to one or more components of an air handling system 305 including at least an air delivery system 304 and an air exhaust system 306. With reference to at least FIG. 3, the fuel cell power module 102 may be configured to couple to the air delivery system 304 and/or the air exhaust system 306. Returning now to FIG. 1, the fuel cell power module 102 includes a housing 104, an air intake manifold 106, and an air exhaust manifold 108. The air intake manifold 106 extends within an interior 103 of the housing 104 and is configured to deliver a flow of air 504 to, for example, fuel the power-generating reaction of the fuel cells disposed within the housing 104. The housing 104 may be enclosed and may comprise a cover 105 via which one or more components within the housing 104 may accessed for service or other purposes. The housing 104 may be sealed along portions of a housing exterior 101 and/or a housing interior 103. Sealing may protect components within the housing 104 from debris and foreign objects.

The housing 104 includes a first sidewall 110 and a second sidewall 112 disposed opposite one another as shown in FIGS. 1 and 2. The first sidewall 110 and the second sidewall 112 may be coupled to each of a top panel 114 and a bottom panel 116. A first end section 118 and a second end section 120 interconnect the first and second sidewalls 110, 112 and the top and bottom panels 114, 116.

Figure 8:
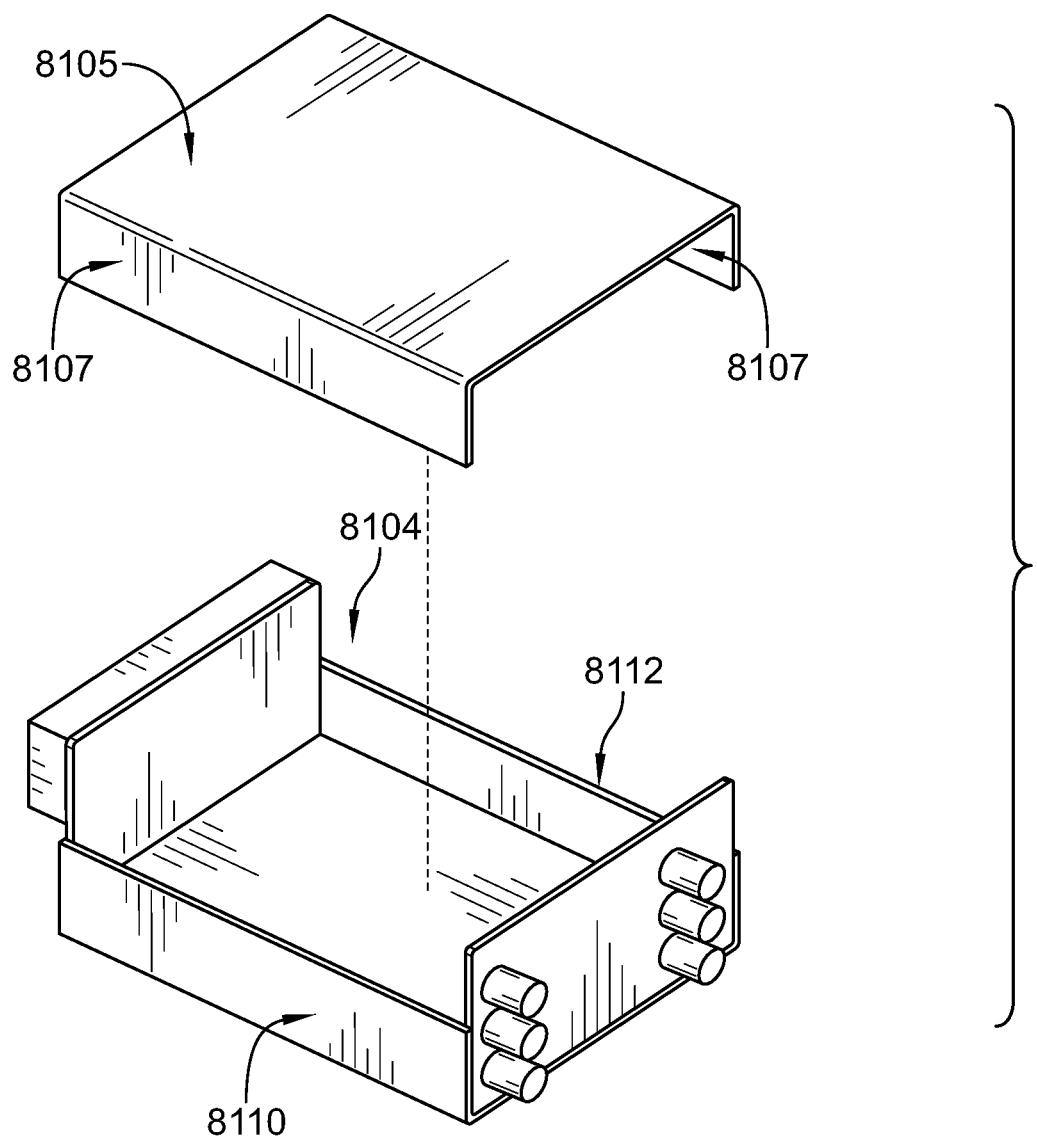
FIG. 8 is a block diagram illustrating a perspective view of another embodiment of the fuel cell power module.

As understood by one skilled in the art, another embodiment of the housing 8104, as shown in FIG. 8, may comprise an open-top rectangular enclosure 8104. The open-top rectangular enclosure 8104 is configured to receive a cover panel 8105 to cover the open-top to enclose and/or seal the rectangular enclosure 8104. In such an example, the cover panel 8105 may include half-walls 8107 disposed about opposite ends of the cover panel 8105.

The half-walls 8107 of the cover panel 8105 may be configured to brace the sidewalls 8110, 8112 of the rectangular enclosure 8104 when the cover panel 8105 is positioned over the open-top to enclose and/or seal the rectangular enclosure 8104. The housing 8104 is substantially similar to the housing 104. Accordingly, the disclosed features and/or characteristics of the housing 104 are included in the housing 8104. Additionally, the disclosure regarding the features of housing 104 is incorporated by reference into the description of the housing 8104 except for the differences explicitly described above.

Referring back to the first embodiment, the air intake manifold 106 extends into the housing 104 via the first end section 118 and may comprise one or more pipes 109, conduits 109, channels 109, valves 109 and other components 109 as shown in FIGS. 1, 2, 4, and 5. In an example, the first end section 118 defines an inlet opening 122 configured to receive at least a portion of the air intake manifold 106. The air delivery system 304 coupled to the air intake manifold 106 may be configured to deliver a flow of air 504 to the fuel cell stack 302 via an air inlet 124 of the housing 104. Accordingly, through the inlet 124, the air intake manifold 106 delivers a flow of air 504 to, for example, support a power-generating chemical reaction of the fuel cells 303 disposed within the housing 104. Inside the housing 104, the pipe 109, conduit 109, or another component 109 of the air intake manifold 106 may be disposed adjacent to and/or in contact with the fuel cell stack 302. Accordingly, the air intake manifold 106 may be configured to support a power-generating chemical reaction of the fuel cells 303.

The exhaust manifold 108 may extend into the interior portion 103 of the housing 104 via the first end section 118 as shown in FIGS. 1 and 2. In an example, the first end section 118 defines an outlet opening 126 configured to receive at least a portion of the exhaust manifold 108. The air exhaust manifold 108 may direct the flow of air away from the housing 104, such as to be evacuated and treated by an air exhaust system 306.

Figure 9:
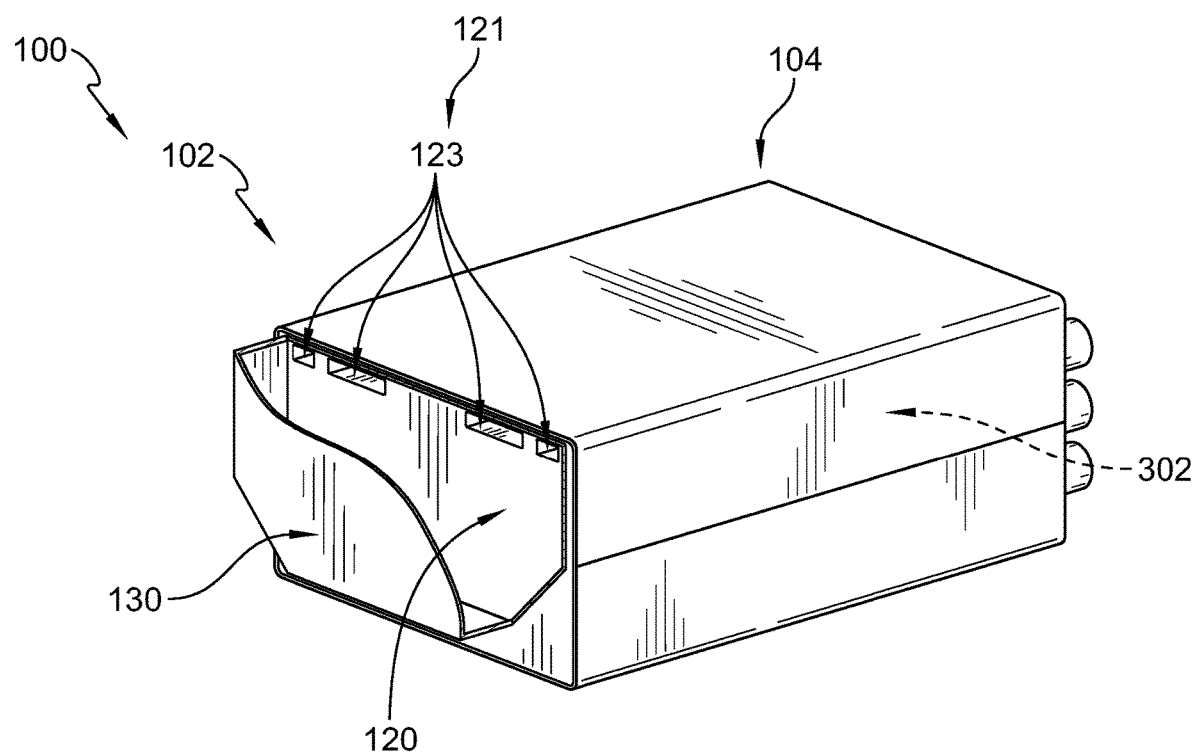
FIG. 9 is a block diagram illustrating a partial cutaway view of the fuel cell power module of FIG. 1.

As illustrated in at least FIG. 2, the second end section 120 of the housing 104 includes an electronics enclosure 130. The electronics enclosure 130 may be configured to house one or more electrical, mechanical, or electromechanical components (not shown), such as fasteners, wires, connectors, conduits, and contactors. The components housed in the electronics enclosure 130 may be configured to couple directly or indirectly to the fuel cell stack 302 disposed within the fuel cell power module 102. In some instances, as shown in FIG. 9, the second end section 120 may include a partition 121 that defines one or more openings 123 to enable the components of the electronics enclosure 130 to electrically or electromechanically couple to the fuel cell stack 302. The electronics enclosure 130 may be hexagon-shaped and, more specifically, may be shaped as an irregular hexagon, such as a convex irregular hexagon.

Figure 4:
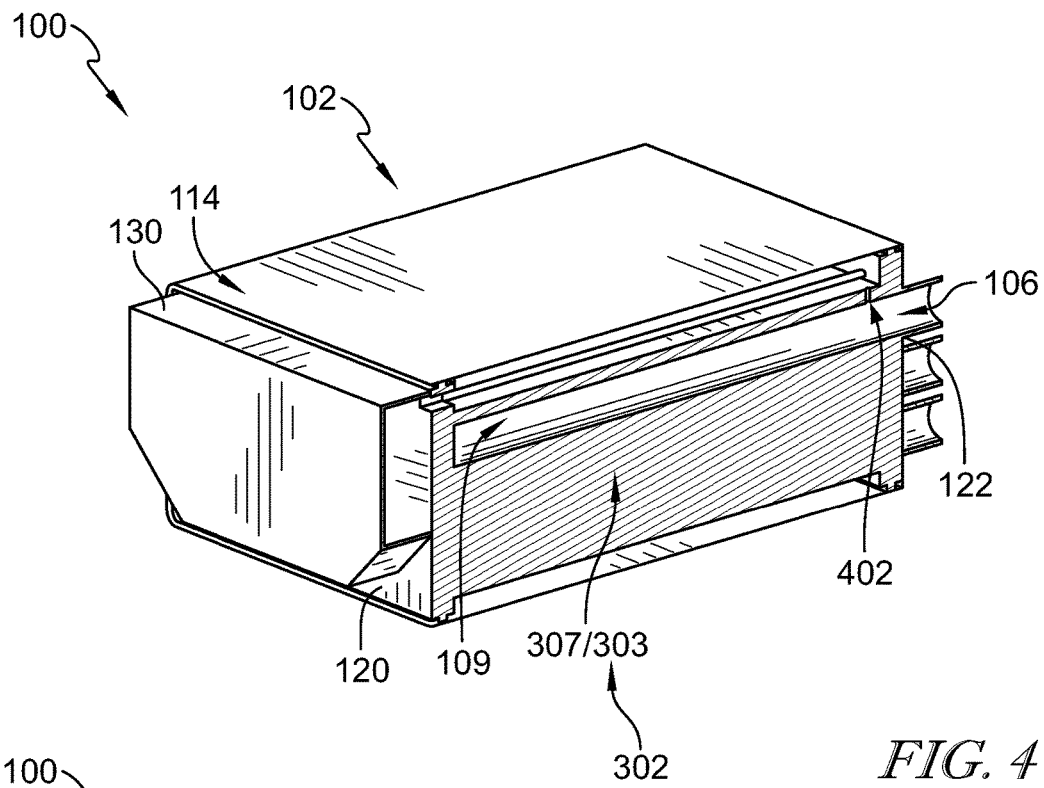
FIG. 4 is a block diagram illustrating a cutaway view of the fuel cell power module of the present disclosure.
Figure 5:
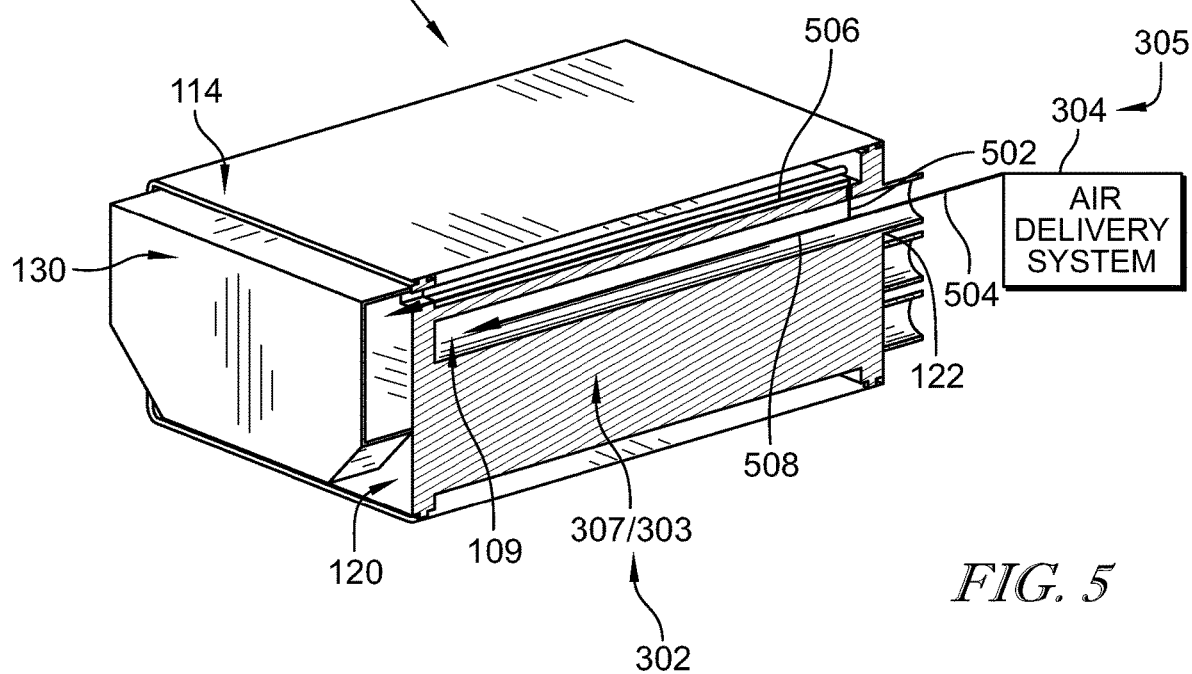
FIG. 5 is a block diagram illustrating an example flow of intake air of the fuel cell power module in accordance with the present disclosure.

FIGS. 4 and 5 illustrate cut-away views of the fuel cell power module 102 adapted for venting in accordance with the present disclosure. The air intake manifold 106 of the present disclosure defines a bleed port (or opening) 402 to redirect a portion 502, 506 of the flow of intake air 504 entering via the inlet opening 122 such that the portion of the flow of intake air bypasses the fuel cell stack 302. The redirected portion 502, 506 of the intake air 504 may mix with molecules of hydrogen that escaped from fuel cell plates 307 to carry the molecules of hydrogen away from the fuel cell stack 302.

In one example, as shown in FIGS. 4 and 5, the opening 402 of the air intake manifold 106 is disposed such that the portion 502, 506 of the flow of intake air 504 is directed toward the top panel 114 to pass above and/or bypass the fuel cell stack 302. Molecules of hydrogen are lighter than air and, as such, may rise above the fuel cell stack 302 after becoming separated from one or more plates 307 of the fuel cell stack 302. The redirected portion 502, 506 of the intake air 504 mixes with molecules of hydrogen present above the fuel cell stack 302 to carry the molecules of hydrogen away from the fuel cell stack 302. As understood by one skilled in the art, remaining intake air flow 508, i.e., a part 508 of the intake air flow not redirected/diverted through the opening 402, may be directed through the air intake manifold 106 to support a power-generating reaction of the fuel cell stack 302.

FIG. 6 illustrates an exemplary implementation for venting the fuel cell power module 102 in accordance with the present disclosure. The housing 104 of the fuel cell power module 102 defines one or more vent apertures 602, 604 configured to vent the redirected portion 502, 506 of the intake air flow. In some instances, the redirected portion 502, 506 of the intake air flow vented through one or more vent apertures 602, 604 is a portion of the intake air redirected from the air intake manifold 106 that passed above the fuel cell stack 302 and mixed with hydrogen present above the fuel cell stack 302. By virtue of being vented, the redirected air flow 502, 506 may evacuate at least a portion of hydrogen from the interior of the housing 104.

As only one example, the bottom panel 116 of the housing 104 defines a bottom panel vent aperture 602 and the electronics enclosure 130 of the housing 104 defines an electronics enclosure vent aperture 604 as shown in FIG. 6. The bottom panel vent aperture 602 and the electronics enclosure vent aperture 604 are configured to vent the redirected portion 502, 506 of the intake air flow, such as the redirected portion 502, 506 of the intake air flow that passed above the fuel cell stack 302 and mixed with hydrogen present above the fuel cell stack 302.

In one example, the bottom panel vent aperture 602 is disposed along a longitudinal axis 610 extending through a center of the bottom panel 116 as shown in FIG. 6. In some instances, the bottom panel vent aperture 602 may be biased toward an end of the bottom panel 116 that couples the second end section 120 and the bottom panel 116, where the second end section 120 is disposed opposite from the first end section 118 including the inlet 124 of the air intake manifold 116.

As illustrated in at least FIG. 7, an example implementation of one or both of the bottom panel vent aperture 602 and the electronics enclosure vent aperture 604 may comprise a cluster 702 of holes 704, wherein a first plurality of holes 704 of the cluster 702 are arranged to form a circle 706. While the cluster 702 of the holes 704 is illustrated as a circle, one skilled in the art would understand that the cluster 702 may take on any configuration, layout, and shape, including, but not limited to, a rectangle, a star, an oval, and a triangle. Furthermore, at least a portion of the cluster 702 may be laid out in straight, curved, or zigzag line.

The following numbered embodiments are contemplated and non-limiting:

1. A system comprising: a housing configured to receive a fuel cell stack; and an air intake manifold extending along the fuel cell stack and configured to direct a flow of air thereto, wherein the air intake manifold is disposed adjacent to and in contact with the fuel cell stack, wherein the air intake manifold defines an opening to redirect a portion of the flow of air to pass above the fuel cell stack to mix with one or more hydrogen molecules present above the fuel cell stack, and wherein the housing defines a vent aperture and the portion of the air including the one or more hydrogen molecules is vented through the vent aperture.

2. A system comprising: a housing configured to receive a fuel cell stack; and an air intake manifold disposed to direct a flow of air toward the fuel cell stack, wherein the air intake manifold is configured to direct a portion of the flow of air to bypass the fuel cell stack to mix with one or more hydrogen molecules released by the fuel cell stack, wherein the housing defines a first vent aperture and a second vent aperture, and wherein the portion of the air, including the one or more hydrogen molecules, is vented through the first vent aperture and the second vent aperture.

3. A system comprising: an enclosure having an open top and configured to receive a fuel cell stack; a cover configured to fit over the open top and brace sidewalls of the enclosure to seal the enclosure; and an air intake manifold extending adjacent to and in contact with the fuel cell stack to direct a flow of air to the fuel cell stack, wherein the air intake manifold defines an opening to redirect a portion of the flow of air to bypass the fuel cell stack, and wherein the housing defines a vent aperture and the portion of the air is vented through the vent aperture.

4. The system of clauses 1, 2 and/or 3, any other suitable clause, or any combination of suitable clauses, wherein the fuel cell stack is configured to receive one or more fuel cells and/or one or more fuel cell systems, including but not limited to a phosphoric acid fuel cell (PAFC), a molten carbonate fuel cell (MCFC), a proton exchange membrane fuel cell, a polymer exchange membrane fuel cell (PEMFC), a PEMFC fueled by hydrogen, and/or a solid oxide fuel cell (SOFC).

5. The system of clauses 1, 2, and/or 3, any other suitable clause, or any combination of suitable clauses, wherein the fuel cell stack is received within a fuel cell power module and/or wherein the housing is comprised within the fuel cell power module.

6. The system of clause 5, any other suitable clause, or any combination of suitable clauses, wherein the fuel cell power module comprises one or more fuel cell systems and/or one or more fuel cell stacks.

7. The system of clause 5, any other suitable clause, or any combination of suitable clauses, wherein the fuel cell power module is configured to communicatively, fluidically, mechanically, or some combination thereof couple to one or more components of an air handling system comprising at least an air delivery system and/or an air exhaust system.

8. The system of clause 7, any other suitable clause, or any combination of suitable clauses, wherein the air delivery system is coupled to the air intake manifold and/or is configured to deliver the flow of air to the fuel cell stack via an air inlet of the housing to support a power-generating chemical reaction of the fuel cells disposed within the housing.

9. The system of clauses 1, 2, and/or 3, any other suitable clause, or any combination of suitable clauses, wherein the system further comprises an air exhaust manifold, and/or wherein the air exhaust manifold extends into an interior portion of the housing via the first end section.

10. The system of clause 9, any other suitable clause, or any combination of suitable clauses, wherein the air exhaust manifold directs the flow of air away from the housing and/or directs the flow of air to be evacuated and/or treated by the air exhaust system.

11. The system of clauses 1, 2, and/or 3, any other suitable clause, or any combination of suitable clauses, wherein the housing includes first and second sidewalls disposed opposite one another and a top panel, a bottom panel, a first end section, and a second end section interconnecting the first and second sidewalls, and/or wherein the bottom panel defines the vent aperture, the first vent aperture, and/or the second vent aperture.

12. The system of clause 11, any other suitable clause, or any combination of suitable clauses, wherein the vent aperture, the first vent aperture, and/or the second vent aperture is disposed along a longitudinal axis extending through a center of the bottom panel, wherein the vent aperture, the first vent aperture, and/or the second vent aperture is biased toward an end of the bottom panel that couples the first end section and the bottom panel, wherein the first end section is disposed opposite from the second end section, and/or wherein an inlet of the air intake manifold is disposed at the second end section.

13. The system of clause 11, any other suitable clause, or any combination of suitable clauses, wherein the vent aperture is a first vent aperture, wherein the first end section defines a second vent aperture, and/or wherein the portion of the air is vented through the first vent aperture and the second vent aperture.

14. The system of clause 11, any other suitable clause, or any combination of suitable clauses, wherein the opening of the air intake manifold is disposed such that the portion of the flow of air is directed toward the top panel to pass above the fuel cell stack.

15. The system of clause 11, any other suitable clause, or any combination of suitable clauses, wherein the first sidewall and the second sidewall are coupled to each of the top panel and the bottom panel.

16. The system of clause 11, any other suitable clause, or any combination of suitable clauses, wherein the first end section and the second end section interconnect the first sidewall, the second sidewall, the top panel, and the bottom panel.

17. The system of clause 11, any other suitable clause, or any combination of suitable clauses, wherein the first end section defines an inlet opening configured to receive at least a portion of the air intake manifold.

18. The system of clause 11, any other suitable clause, or any combination of suitable clauses, wherein the first end section defines an outlet opening configured to receive at least a portion of an air exhaust manifold.

19. The system of clause 11, any other suitable clause, or any combination of suitable clauses, wherein the second end section includes an electronics enclosure.

20. The system of clause 19, any other suitable clause, or any combination of suitable clauses, wherein the electronics enclosure is configured to house one or more components.

21. The system of clause 21, any other suitable clause, or any combination of suitable clauses, wherein the one or more components are one or more electrical, mechanical, and/or electromechanical components, and/or fasteners, wires, connectors, conduits, and/or contactors.

22. The system of clause 21, any other suitable clause, or any combination of suitable clauses, wherein the one or more components are configured to couple directly and/or indirectly to the fuel cell stack disposed within the fuel cell power module.

23. The system of clause 19, any other suitable clause, or any combination of suitable clauses, wherein the electronics enclosure is hexagon-shaped and/or is shaped as an irregular hexagon and/or a convex irregular hexagon.

24. The system of clause 11, any other suitable clause, or any combination of suitable clauses, wherein the second end section includes a partition that defines one or more openings to enable the one or more components of the electronics enclosure to electrically and/or electromechanically couple to the fuel cell stack.

25. The system of clause 11, any other suitable clause, or any combination of suitable clauses, wherein the top panel is the cover.

26. The system of clauses 1, 2, and/or 3, any other suitable clause, or any combination of suitable clauses, wherein the housing defines a cluster of holes arranged to form a circle.

27. The system of clauses 1, 2, and/or 3, any other suitable clause, or any combination of suitable clauses, wherein the system further comprises an exhaust manifold configured to direct a flow of exhaust air away from the fuel cell stack.

28. The system of clauses 1, 2, and/or 3, any other suitable clause, or any combination of suitable clauses, wherein the housing includes the electronics enclosure, and/or wherein the electronics enclosure defines the vent aperture and/or the first vent aperture.

29. The system of clause 36, any other suitable clause, or any combination of suitable clauses, wherein the housing includes the top panel and the bottom panel interconnected by the first sidewall and the second sidewall, and/or wherein the bottom panel defines the vent aperture and/or the second vent aperture.

30. The system of clause 37, any other suitable clause, or any combination of suitable clauses, wherein the vent aperture and/or the second vent aperture is disposed along a longitudinal axis extending through a center of the bottom panel, wherein the vent aperture and/or the second vent aperture is biased toward a first end of the bottom panel disposed opposite from a second end of the bottom panel, and/or wherein an inlet of the air intake manifold is disposed at the second end.

31. The system of clause 37, any other suitable clause, or any combination of suitable clauses, wherein the portion of the flow of air is directed toward the opening and away from the fuel cell stack.

32. The system of clause 39, any other suitable clause, or any combination of suitable clauses, wherein the opening of the air intake manifold is disposed such that the portion of the flow of air is directed toward the top panel to pass above the fuel cell stack to mix with the one or more hydrogen molecules present above the fuel cell stack.

33. The system of clauses 1, 2, and/or 3, any other suitable clause, or any combination of suitable clauses, wherein the housing is enclosed.

34. The system of clauses 1, 2, and/or 3, any other suitable clause, or any combination of suitable clauses, wherein the housing comprises a cover via which one or more components within the housing are accessed for service and/or other purposes.

35. The system of clauses 1, 2, and/or 3, any other suitable clause, or any combination of suitable clauses, wherein the housing is sealed along portions of a housing exterior and/or the housing interior.

36. The system of clause 43, any other suitable clause, or any combination of suitable clauses, wherein sealing protects components within the housing from debris and/or foreign objects.

37. The system of clauses 1, 2, and/or 3, any other suitable clause, or any combination of suitable clauses, wherein the air intake manifold extends within the interior of the housing, and/or extends within the interior of the housing via the first end section.

38. The system of clauses 1, 2, and/or 3, any other suitable clause, or any combination of suitable clauses, wherein the air intake manifold is configured to deliver the flow of air to fuel the power-generating reaction of the fuel cells disposed within the housing.

39. The system of clauses 1, 2, and/or 3, any other suitable clause, or any combination of suitable clauses, wherein the air intake manifold comprises one or more pipes, conduits, channels, valves, and/or other components.

40. The system of clause 47, any other suitable clause, or any combination of suitable clauses, wherein the one or more pipes, conduits, channels, valves, and/or other components are disposed adjacent to and/or in contact with the fuel cell stack.

41. The system of clauses 1, 2, and/or 3, any other suitable clause, or any combination of suitable clauses, wherein the air intake manifold extends through an interior of the enclosure, and/or wherein one of a cover and a bottom of the enclosure defines the vent aperture.

42. The system of clause 49, any other suitable clause, or any combination of suitable clauses, wherein the vent aperture is a first vent aperture, wherein the enclosure includes a first end section and a second end section disposed opposite the first end section, and/or wherein the first end section defines a second vent aperture.

43. The system of clause 50, any other suitable clause, or any combination of suitable clauses, wherein the portion of the air is vented through the first vent aperture and the second vent aperture.

44. The system of clauses 1, 2, and/or 3, any other suitable clause, or any combination of suitable clauses, wherein the opening of the air intake manifold is disposed such that the portion of the flow of air is directed toward one of the cover and/or the top panel and a bottom of the enclosure to pass above and/or bypass the fuel cell stack.

45. The system of clause 52, any other suitable clause, or any combination of suitable clauses, wherein a different one of the cover and the bottom of the enclosure defines the vent aperture.

46. The system of clauses 1, 2, and/or 3, any other suitable clause, or any combination of suitable clauses, wherein the opening of the air intake manifold is a bleed port and/or another opening sized to permit air flow within the housing.

47. The system of clauses 1, 2, and/or 3, any other suitable clause, or any combination of suitable clauses, wherein the opening of the air intake manifold allows a portion of air flow within the housing to be redirected to bypass the fuel cell stack and/or redirects the portion of the flow of air entering via the inlet opening.

48. The system of clauses 1, 2, and/or 3, any other suitable clause, or any combination of suitable clauses, wherein the flow of air is intake air flow, intake air, and/or air flow.

49. The system of clauses 1, 2, and/or 3, any other suitable clause, or any combination of suitable clauses, wherein the flow of air that is not redirected and/or diverted through the opening of the air intake manifold is directed through the air intake manifold to support the power-generating reaction of the fuel cell stack.

50. The system of clauses 1, 2, and/or 3, any other suitable clause, or any combination of suitable clauses, wherein the portion of the flow of air is a redirected portion of the flow of air.

51. The system of clauses 1, 2, and/or 3, any other suitable clause, or any combination of suitable clauses, wherein the portion of the flow of air that is redirected mixes with molecules of hydrogen that escaped from fuel cell plates of the fuel cell stack to carry the molecules of hydrogen away from the fuel cell stack.

52. The system of clauses 1, 2, and/or 3, any other suitable clause, or any combination of suitable clauses, wherein the portion of the flow of air evacuates at least a portion of the one or more hydrogen molecules from the interior of the housing.

53. The system of clauses 1, 2, and/or 3, any other suitable clause, or any combination of suitable clauses, wherein the one or more hydrogen molecules.

54. The system of clauses 1, 2, and/or 3, any other suitable clause, or any combination of suitable clauses, wherein at least one of the first vent aperture and the second vent aperture comprises a cluster of holes, and/or wherein the cluster is circle-shaped.

55. The system of clauses 1, 2, and/or 3, any other suitable clause, or any combination of suitable clauses, wherein the vent aperture is the first vent aperture and/or the second vent aperture.

56. The system of clauses 1, 2, and/or 3, any other suitable clause, or any combination of suitable clauses, wherein the vent aperture, the first vent aperture, and/or the second vent aperture is a bottom panel vent aperture and/or an electronics enclosure vent aperture.

57. The system of clauses 1, 2, and/or 3, any other suitable clause, or any combination of suitable clauses, wherein the vent aperture is one or more vent apertures that vent and/or release the redirected portion of air flow from within the interior of the housing.

58. The system of clause 65, any other suitable clause, or any combination of suitable clauses, wherein venting and/or redirecting the portion of the intake air flow lowers an amount of hydrogen, lowers pressure within the housing, provides positive pressure to dry air, and/or minimizes the likelihood that water, water vapor, and/or condensation forms and/or persists within the interior of the housing.

59. The system of clauses 1, 2, and/or 3, any other suitable clause, or any combination of suitable clauses, wherein the bottom panel defines the bottom panel vent aperture.

60. The system of clauses 1, 2, and/or 3, any other suitable clause, or any combination of suitable clauses, wherein the electronics enclosure defines the electronics enclosure vent aperture.

61. The system of clauses 1, 2, and/or 3, any other suitable clause, or any combination of suitable clauses, wherein the bottom panel vent aperture and/or the electronics enclosure vent aperture are configured to vent the redirected portion of the intake air flow.

62. The system of clauses 1, 2, and/or 3, any other suitable clause, or any combination of suitable clauses, wherein the vent aperture, the first vent aperture, the second vent aperture, and/or the bottom panel vent aperture is disposed along a longitudinal axis extending through a center of the bottom panel.

63. The system of clauses 1, 2, and/or 3, any other suitable clause, or any combination of suitable clauses, wherein the vent aperture, the first vent aperture, the second vent aperture, and/or the bottom panel vent aperture is biased toward an end of the bottom panel that couples the second end section and the bottom panel.

64. The system of clause 71, any other suitable clause, or any combination of suitable clauses, wherein the second end section is disposed opposite from the first end section including the inlet of the air intake manifold.

65. The system of clauses 1, 2, and/or 3, any other suitable clause, or any combination of suitable clauses, wherein the vent aperture, the first vent aperture, the second vent aperture, the bottom panel vent aperture, and/or the electronics enclosure vent aperture comprises a cluster of holes.

66. The system of clause 73, any other suitable clause, or any combination of suitable clauses, wherein the cluster of holes comprises a first plurality of holes.

67. The system of clause 74, any other suitable clause, or any combination of suitable clauses, wherein the first plurality of holes are arranged to form a circle, a rectangle, a star, an oval, a triangle, and/or any configuration, layout, and shape.

68. The system of clause 74, any other suitable clause, or any combination of suitable clauses, wherein at least a portion of the cluster of holes is laid out in a straight, curved, and/or zigzag line.

The features illustrated or described in connection with one exemplary embodiment may be combined with any other feature or element of any other embodiment described herein. Such modifications and variations are intended to be included within the scope of the present disclosure. Further, a person skilled in the art will recognize that terms commonly known to those skilled in the art may be used interchangeably herein.

The above embodiments are described in sufficient detail to enable those skilled in the art to practice what is claimed and it is to be understood that logical, mechanical, and electrical changes may be made without departing from the spirit and scope of the claims. The detailed description is, therefore, not to be taken in a limiting sense.

While the concepts of the present disclosure are susceptible to various modifications and alternative forms, specific exemplary embodiments are been shown by way of example in the drawings and will be described. It should be understood, however, that there is no intent to limit the concepts of the present disclosure to the particular forms disclosed; on the contrary, the intention is to cover all modifications, equivalents, and alternatives falling within the spirit and scope of the present disclosure as defined by the appended claims.

References in the specification to "one embodiment," "an embodiment," "an illustrative embodiment," etc., indicate that the described embodiment may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present disclosure and fall within the spirit and scope of the present disclosure as defined by the appended claims.

The invention claimed is:

1. A venting system comprising:
a housing configured to receive a fuel cell stack; and
an air intake manifold extending along the fuel cell stack and configured to direct a flow of air thereto, wherein the air intake manifold is disposed adjacent to and in contact with the fuel cell stack,
wherein the air intake manifold defines an opening to redirect a portion of the flow of air to pass above the fuel cell stack to mix with one or more hydrogen molecules present above the fuel cell stack, and
wherein the housing defines a vent aperture and the portion of the flow of air including the one or more hydrogen molecules is vented through the vent aperture.

2. The venting system of claim 1, wherein the housing includes first and second sidewalls disposed opposite one another and a top panel, a bottom panel, a first end section, and a second end section interconnecting the first and second sidewalls, and wherein the bottom panel defines the vent aperture.

3. The venting system of claim 2, wherein the vent aperture is disposed along a longitudinal axis extending through a center of the bottom panel, wherein the vent aperture is biased toward an end of the bottom panel that couples the first end section and the bottom panel, wherein the first end section is disposed opposite from the second end section, and wherein an inlet of the air intake manifold is disposed at the second end section.

4. The venting system of claim 2, wherein the vent aperture is a first vent aperture, wherein the first end section defines a second vent aperture, and wherein the portion of the flow of air is vented through the first vent aperture and the second vent aperture.

5. The venting system of claim 2, wherein the opening of the air intake manifold is disposed such that the portion of the flow of air is directed toward the top panel to pass above the fuel cell stack.

6. The venting system of claim 1, wherein the housing defines a cluster of holes arranged to form a circle.

7. The venting system of claim 1, further comprising an exhaust manifold configured to direct a flow of exhaust air away from the fuel cell stack.

8. A system for venting a fuel cell enclosure comprising:
a housing configured to receive a fuel cell stack; and
an air intake manifold disposed to direct a flow of air toward the fuel cell stack, wherein the air intake manifold is configured to direct a portion of the flow of air to bypass the fuel cell stack to mix with one or more hydrogen molecules released by the fuel cell stack,
wherein the housing defines a first vent aperture and a second vent aperture, and wherein the portion of the flow of air, including the one or more hydrogen molecules, is vented through the first vent aperture and the second vent aperture,
wherein the housing includes an electronics enclosure, and wherein the electronics enclosure defines the first vent aperture.

9. The system of claim 8, wherein the housing includes a top panel and a bottom panel interconnected by a first sidewall and a second sidewall, and wherein the bottom panel defines the second vent aperture.

10. The system of claim 9, wherein the second vent aperture is disposed along a longitudinal axis extending through a center of the bottom panel, wherein the second vent aperture is biased toward a first end of the bottom panel disposed opposite from a second end of the bottom panel, and wherein an inlet of the air intake manifold is disposed at the second end.

11. The system of claim 9, wherein the air intake manifold defines an opening, wherein the portion of the flow of air is directed toward the opening and away from the fuel cell stack.

12. The system of claim 11, wherein the opening of the air intake manifold is disposed such that the portion of the flow of air is directed toward the top panel to pass above the fuel cell stack to mix with the one or more hydrogen molecules present above the fuel cell stack.

13. The system of claim 8, wherein at least one of the first vent aperture and the second vent aperture comprises a cluster of holes, and wherein the cluster of holes is circle-shaped.

14. The system of claim 8, further comprising an exhaust manifold configured to direct a flow of exhaust air away from the fuel cell stack.

15. The system of claim 8, wherein the air intake manifold defines an opening, wherein the portion of the flow of air is directed toward the opening and away from the fuel cell stack.

16. A fuel cell enclosure venting system comprising:
an enclosure having an open top and configured to receive a fuel cell stack;
a cover configured to fit over the open top and brace sidewalls of the enclosure to seal the enclosure; and
an air intake manifold extending adjacent to and in contact with the fuel cell stack to direct a flow of air to the fuel cell stack, wherein the air intake manifold defines an opening to redirect a portion of the flow of air to bypass the fuel cell stack, and wherein the enclosure defines a vent aperture and the portion of the flow of air is vented through the vent aperture.

17. The fuel cell enclosure venting system of claim 16, wherein the air intake manifold extends through an interior of the enclosure, and wherein a bottom of the enclosure defines the vent aperture.

18. The fuel cell enclosure venting system of claim 17, wherein the vent aperture is a first vent aperture, wherein the enclosure includes a first end section and a second end section disposed opposite the first end section, and wherein the first end section defines a second vent aperture.

19. The fuel cell enclosure venting system of claim 18, wherein the portion of the flow of air is vented through the first vent aperture and the second vent aperture.

20. The fuel cell enclosure venting system of claim 16, wherein the opening of the air intake manifold is disposed such that the portion of the flow of air is directed toward the cover to bypass the fuel cell stack.

* * * * *